Aug. 12, 1958 L. A. MINTON 2,847,233
TRAILER HITCH WITH MULTIPLE PIVOT AXES
Filed May 6, 1955 2 Sheets-Sheet 2
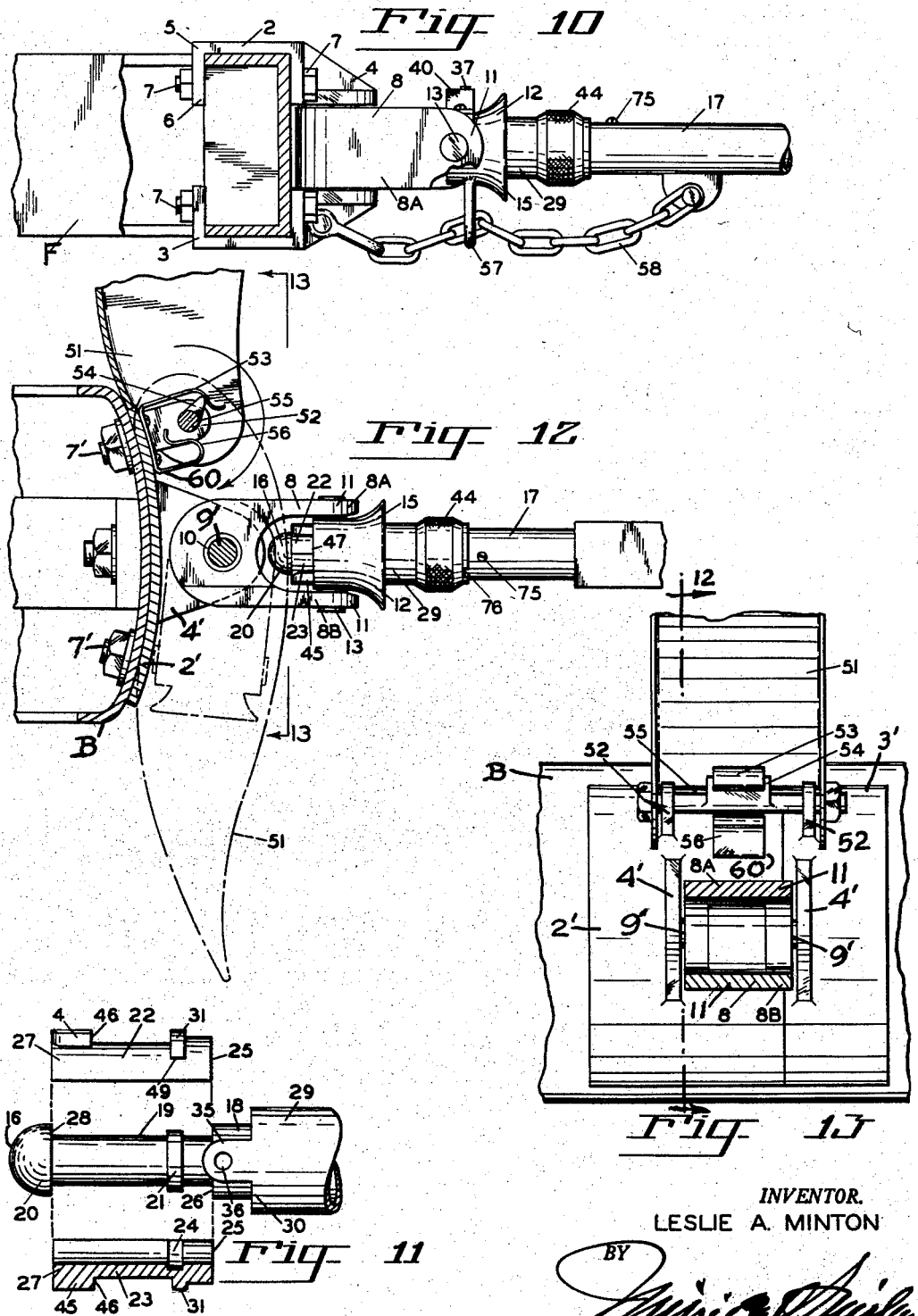
INVENTOR.
LESLIE A. MINTON United States Patent Office 2,847,233
Patented Aug. 12, 1958

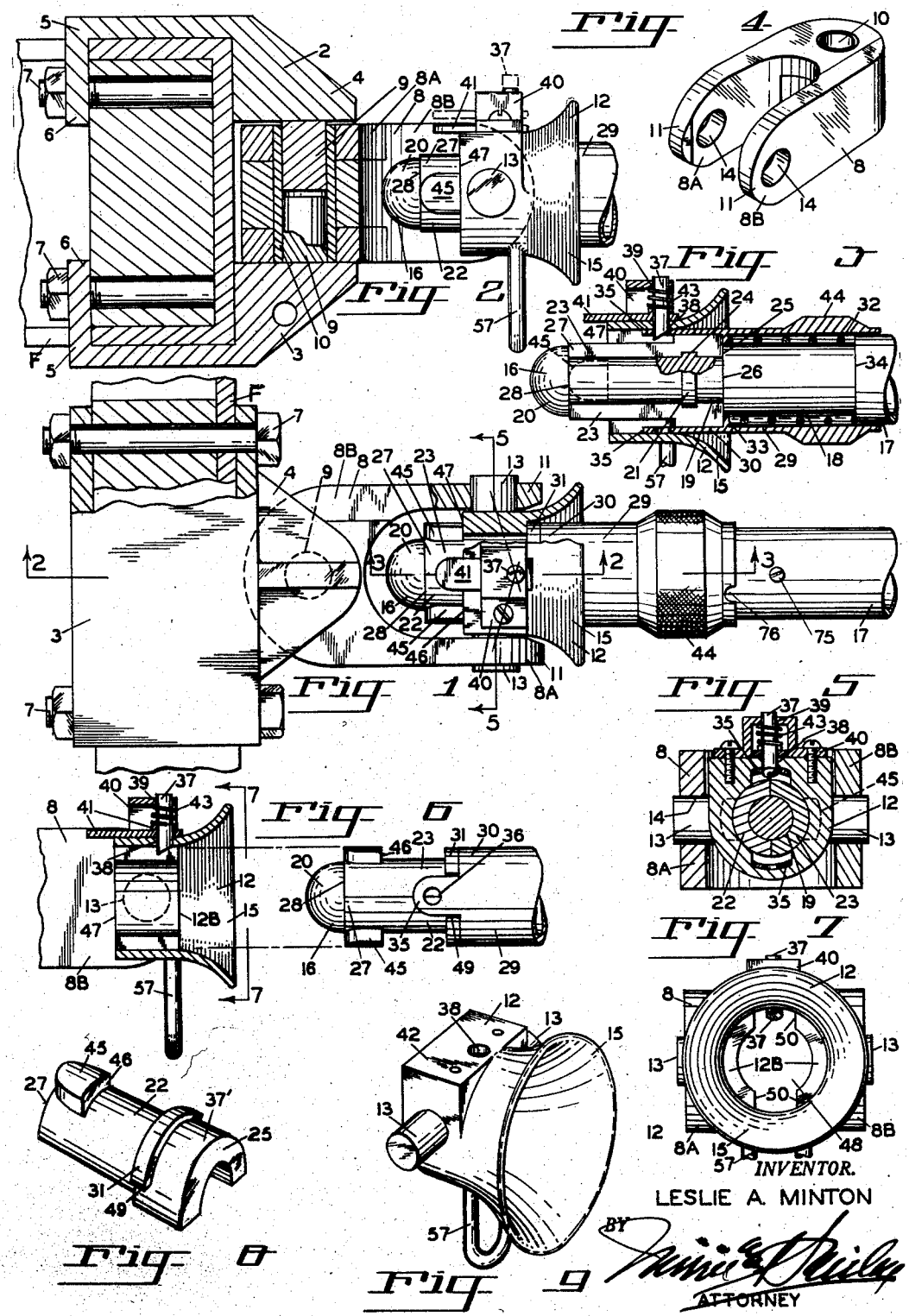

2,847,233

TRAILER HITCH WITH MULTIPLE PIVOT AXES

Leslie A. Minton, Portland, Oreg.

Application May 6, 1955, Serial No. 506,466

3 Claims. (Cl. 280—504)

This invention relates broadly to trailer hitches or couplers, and more particularly to a trailer hitch having a dual locking feature especially adapted to logging trailers and the like.

The primary object of this invention is to provide a dual locking safety feature within a trailer hitch or coupler.

Another object of the invention is to provide a hitch that is easily coupled and easily released.

A further object of the invention is to provide a hitch that may be manually coupled and uncoupled without requiring the use of tools.

Still another object of the invention lies in the provision of a bumper guard which may be positioned to cover and protect the hitch when the latter is uncoupled.

A still further object of the invention is to provide a trailer hitch having simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a plan view of a new and improved trailer hitch according to the present invention, parts being broken away for convenience of illustration, and fragmentary portions of a tractor frame and trailer tongue being also shown to illustrate the mode of mounting the hitch;

Figure 2 is a cross-sectional view taken on line 2—2 of Fig. 1;

Figure 3 is a cross-sectional view taken on line 3—3 of Fig. 1, illustrating the means for holding the dual lock in locked position;

Figure 4 is a perspective view of a yoke that forms part of a universal joint which supports the receiving member of the improved trailer hitch;

Figure 5 is a cross-sectional view taken on line 5—5 of Fig. 1;

Figure 6 is an exploded side view in elevation, with parts broken away, of the end of the trailer tongue separated from the receiving member of the hitch;

Figure 7 is an end view in elevation of the female or receiving member of the hitch, as viewed from line 7—7 of Fig. 6;

Figure 8 is a perspective view of one of the locking or pulling elements;

Figure 9 is a perspective view of the female locking member of the hitch;

Figure 10 is a side view showing the hitch assembled with a safety chain associated therewith;

Figure 11 is an exploded side view of the male end of the hitch, illustrating the locking or pulling elements associated therewith;

Figure 12 is a side view, with parts broken away, of the trailer hitch and an ornamental bumper bar for enclosing the hitch when it is uncoupled, and Figure 13 is a fragmentary cross-sectional view taken on line 13—13 of Fig. 12.

Referring now to the drawings, specifically to Figs. 1 and 2, a trailer hitch according to the present invention comprises a pair of oppositely disposed clamping members 2 and 3 adapted for connection to the frame F of a tractor vehicle. These members include body portions 4, having jaws 5 and flanges 6 adapted to fit over and behind the frame F of the tractor. The clamping members are attached to the trailer frame by the bolts 7. The foregoing clamping assembly provides a firm solid support for the other portions of the hitch.

Stub shafts 9 are respectively carried by the body portions 4 and project toward each other from the clamping members 2 and 3 and form a journal for a bearing 10 of a yoke 8. The yoke 8, best shown in Figure 4, is formed of two separable parts 8A and 8B that have interfitting and overlapping parts which are bored to jointly receive and support a sleeve that forms the bearing 10, but which are capable of separation for assembly with a female locking member 12. The body portions 4 of the clamps 2 and 3 serve to retain together the yoke parts 8A and 8B and the sleeve 10 while the stub shafts 9 provide an axis for pivotal movement of the yoke.

The yoke 8 has a pair of arms 11, each having a bearing 14 with these bearings being in alignment. The female locking member 12 is pivotally supported between the arms 11 of the yoke 8 by means of laterally extending stub shafts 13 which are journalled in the bearings 14 of the yoke arms. The female member 12 is provided with a flared bell-shaped collar 15 adapted to receive the end 16 of a trailer tongue 17.

The trailer tongue 17 has stepped portions 18 and 19 which are respectively reduced in diameter, as best illustrated in Figs. 3 and 11. The reduced portion 19 terminates in an enlarged rounded head 20 defining the end 16 of the tongue. Surrounding the reduced portion 19 intermediate its length is a fixed annular rib 21. Semi-cylindrical locking or pulling elements 22 and 23 are rotatably seated on the reduced portion 19 and are provided with annular grooves 24 in their inner sides which nest or embrace the rib 21.

The ends 25 of these elements 22 and 23 engage the shoulder 26 between the portions 19 and 18 and the ends 27 of said elements engage the shoulder 28 formed by the head 20, the rib and shoulders preventing longitudinal movement of said elements. The elements 22 and 23 are provided with enlarged portions 37' adjacent their ends 25, these enlarged portions jointly forming a cylinder.

A sleeve 29 surrounds the trailer tongue 17 adjacent the end thereof and has an outer end 30 which telescopes over the enlarged ends 37' of the pulling elements 22 and 23 to secure them in place on the tongue. The sleeve is resiliently maintained against shoulder 31 of the enlarged portions 37' by a coil spring 32 surrounding the reduced portion 18 of the trailer tongue. The spring 32 is interposed between an internally disposed flange 33 forming part of the sleeve 29 and a shoulder 34 between the reduced portion 18 and the circumference of the tongue.

A pair of lugs 35 project from the end of sleeve 29 into open spaces between the ends 49 of the shoulders 31 on the assembled pulling units. Lugs 35 impart turning movement to the pulling units through the shoulders 31 when the sleeve 29 is rotated by force applied to the knurled hand grip portion 44. The lugs 35 also provide a locking function since openings 36 formed therein are adapted to receive a locking bolt 37.

A removable frame 40 is attached to the upper surface of the female member 12 by screws or other suitable means. The locking bolt 37 is guided through the bearing 38 of the member 12 and the bearing 39 formed in the frame 40. A lever 41, preferably formed as an integral part of the bolt 37 rests on the surface 42 of the member 12. A spring 43 rests on the lever and under the frame 40, forcing the bolt through the opening 36 of the lug 35. The under surface of bolt 37 is tapered so that it may be cammed upwardly against the action of the spring 43.

A second set of locking lugs 45 are formed on the pulling elements 22 and 23. The lugs are each provided with a shoulder 46 which engages the end surface 47 of the female member 12 to prevent uncoupling of the hitch. A pair of opposed grooves 50 are formed in the wall of the female member 12 in the area of its reduced opening 48. These grooves 50 permit passage of the locking lugs 45 and 35 during insertion and withdrawal of the trailer tongue to couple or uncouple the trailer.

It should be noted that the pairs of locking lugs 35 and 45 are disposed at right angles to each other so that only one pair of lugs can be received in the grooves 50 at a given time. A safety chain 58 may be secured to the tongue 17 and passing through a loop 57 fixed externally of the female member 12 and connected to the body 4 of the trailer hitch clamp which is secured to the tractor vehicle, as shown in Fig. 10.

Forwardly of the sleeve 29, the tongue is provided with a stop 75 to limit retraction of the sleeve while the tongue is coupled in the female part and thereby prevent accidental release of the pulling elements. The sleeve is provided with a notch 76 in its forward end and in normal operating position of the sleeve, this notch 76 is displaced angularly out of alignment with the stop 75. If it becomes necessary to remove the pulling elements 22 or 23, the tongue 17 is removed from the hitch and the sleeve 29 is revolved so that the notch 76 registers with the stop 75. The sleeve can then be pulled back a sufficient distance to permit the pulling elements to be removed or replaced.

The foregoing hitch is shown as attached to the frame of the towing vehicle and with the yoke 8 journalled on a vertical axis. The hitch is readily adaptable for attachment to automobile bumpers and such an arrangement is shown in Figs. 12 and 13. Moreover, this modified structure is preferably arranged with the yoke 8 journalled on a horizontal axis so that the tow portion of the hitch may be swung down in a pendent position when not in use, and in addition, a bumper guard cover 51 may be provided to enclose the depending tow portion.

According to this arrangement, the hitch clamp is secured to the automobile bumper B and the clamp, for example, may comprise two clamping members 2' and 3' in the form of plates adapted to fit the bumper B in side-by-side relation. These members may be provided with stud bolts 7' inserted through the bumper to rigidly fix the members 2', 3' thereon. Each of the members 2', 3' has an outstanding lug or body portion 4' carrying a stud shaft 9', which shafts 9' jointly support the bearing 10 of the yoke 8 as previously described. When the clamping members are secured on the bumper B, the shafts 9' are disposed horizontally.

Each of the members 2', 3' is also provided with an outstanding ear 52 having a bolt hole therein and in operative position these ears are parallel and their holes are axially aligned. In addition, one of the members 2' is provided with a spring 60 having outstanding arms 53 and 56. A cam shaft 55 is journalled in the ears 52 and this shaft is provided with a cam 54 intermediate its ends and operatively positioned for engagement with said spring arms 53 and 56 respectively. A combination bumper guard and cover 51 is fixed with and pivotally supported by said shaft 55.

The object of the bumper guard 51 is to ornamentally cover and protect the tow part of the hitch which is connected to the bumper B of an automobile. When the tow portion of the hitch is swung down about the bearing 10 to the broken line position in Fig. 12, the guard 51 can be swung down over the tow portion as also shown in broken lines. The spring arm 53 holds this guard in raised position by engagement with the cam 54 of the shaft 55, conversely, the spring arm 56 engages the cam 54 to hold the guard in the lowered operative position. The spring 53 will not permit the guard to be pulled backward accidentally and the cam will return the guard to the running position shown by broken line.

I will now describe the operation of my new and improved trailer hitch. The operator grasps the tongue 17, enters the tip 16 into the opening 48 of the female locking unit 12 with the lugs 45 passing along and completely through the grooves 50. When this has occurred the sleeve 29 will strike the portion 12B of the bell-shaped opening 15, retracting the sleeve 29 and compressing the coil spring 32.

The operator then grasps the sleeve by the knurled portion 44 and turns the sleeve until extensions 35 register with the grooves 50, at which time the spring 32 will force the said sleeve to the position shown in Figs. 1 and 3. Rotation of the sleeve turns the lugs 45 into locking engagement against the outer shoulder 47 of the receiving member 12. The bolt 37 pressed by spring 43 will drop into the opening 36 of the sleeve extension 35 preventing the sleeve from being retracted and double locking the hitch in coupled condition.

While the trailer is under tow, the shoulder 28 of the head 20 at the end 16 of the trailer tongue bears against the ends 27 of the pulling elements 22 and 23, taking most of the pull. The shoulders 46 of the lugs 45 take the pull exerted on the pulling units 22 and 23 by the female member. The shoulder 21 formed on the reduced portion 19 of the tongue engages the recess 24 within the pulling elements 22 and 23 and provides a second pulling safety feature in the event the extreme head 20 of the tongue should become pulled away. Such a feature has long been desired in trailer hitches. An additional safety feature resides in the use of the chain 58.

In order to uncouple the hitch and remove the lugs 45 from within the female locking unit 12, the pulling units must be revolved 90 degrees from the position shown in Fig. 5. The positioning of lugs 35 in the grooves 50 prevent the rotation in either direction of the sleeve 29 when the spring 32 forces it to the position shown in Figs. 1 and 3. This provides a single lock for holding the hitch together.

A second or dual locking feature is provided by the bolt 37 entering the hole 36 of the extension 35, preventing withdrawal of the outer end 30 of sleeve 29 and trailer tongue from the female member until the bolt 37 is released intentionally by use of lever 41. The locking bolt 37 also prevents the sleeve from moving away from the position shown, if the spring 32 should break.

When it is desired to uncouple the hitch, the operator lifts lever 41 to elevate lock bolt 37 and permit longitudinal retraction of sleeve 29 until the sleeve extensions 35 are free of the grooves 50. The sleeve may then be rotated, imparting similar motion to the pulling elements 22 and 23 through shoulders 31, until the locking lugs 45 are aligned with grooves 50 of the female member. The trailer tongue and sleeve 29 may then be longitudinally withdrawn from the female member 12.

While the new and improved hitch or coupling device hereinbefore described is particularly adapted to be used as a trailer coupler, with minor changes in construction it can be readily adapted for employment on removable banister newel posts, flag staffs, clothes line poles, gate chains, gate locks and slides, cable couplers, electric light fixtures, flexible shafts and the like.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. In a trailer coupler, a female member adapted to be pivotally attached to a tractor vehicle and having an opening for longitudinal insertion of a trailer tongue, a male member carried by said tongue, and locking means on said members for cooperatively and releasably securing said members together, said means including relatively rotatable locking portions on said members to prevent withdrawal of said trailer tongue from said opening, relatively axially movable interengaging portions on said members for preventing rotational disengagement of said locking portions, and releasably interlocking parts on said members to prevent relative axial movement between said interengaging portions and also prevent longitudinal withdrawal of said trailer tongue from said opening in the female member.

2. A dual locking coupling device as set forth in claim 1 wherein said male member comprises a sleeve and a pair of pulling elements, said elements being rotatably mounted on the trailer tongue and having surfaces interfitting therewith to prevent longitudinal movement along said tongue, said sleeve being rotatable on the trailer tongue and telescoping over a portion of said pulling elements to hold them on the tongue, said elements and sleeve each having locking lugs forming part of said locking means, and means on said sleeve engaging said elements to turn them about said trailer tongue when the sleeve is rotated.

3. A trailer coupler as set forth in claim 2 wherein said pulling elements are semi-cylindrical, said locking lugs on the elements and sleeve being disposed at different angles about the trailer tongue, said opening of the female member having a groove in its wall adapted to slidably receive said locking lugs during insertion and withdrawal of the trailer tongue, and retractable spring means biasing said sleeve toward said pulling elements, the retraction of said spring means serving to partially separate the elements and the sleeve to allow said locking lugs on the pulling elements to be turned into and out of alignment with said groove in the female member, while the locking lugs on said sleeve are out of engagement with said groove.

References Cited in the file of this patent

UNITED STATES PATENTS

| | | |
|---|---|---|
| Re. 18,007 | Lambey | Mar. 24, 1931 |
| 1,333,384 | Buller | Mar. 9, 1920 |
| 1,610,902 | Tomlinson | Dec. 14, 1926 |
| 2,062,788 | Jacob | Dec. 1, 1936 |
| 2,133,065 | Weber | Oct. 11, 1938 |
| 2,442,682 | Frieder | June 1, 1948 |
| 2,446,347 | Walkowiak | Aug. 3, 1948 |
| 2,512,222 | Brock | June 20, 1950 |
| 2,743,118 | Solomon | Apr. 24, 1956 |